June 26, 1962    A. FOLTA    3,040,385
METHOD OF JACKETING A CAPACITOR AND PRODUCT
Filed Dec. 5, 1960    2 Sheets-Sheet 1
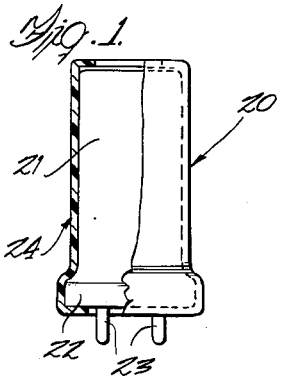
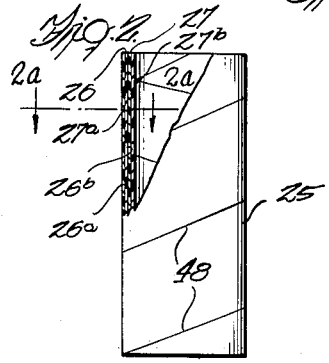
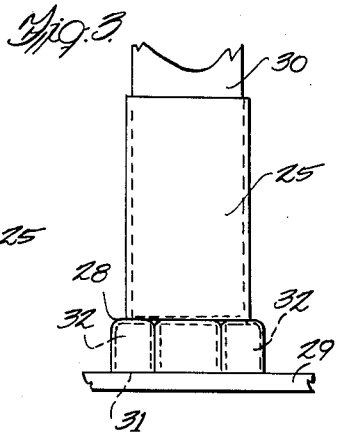
TUBE FORMATION SEQUENCE
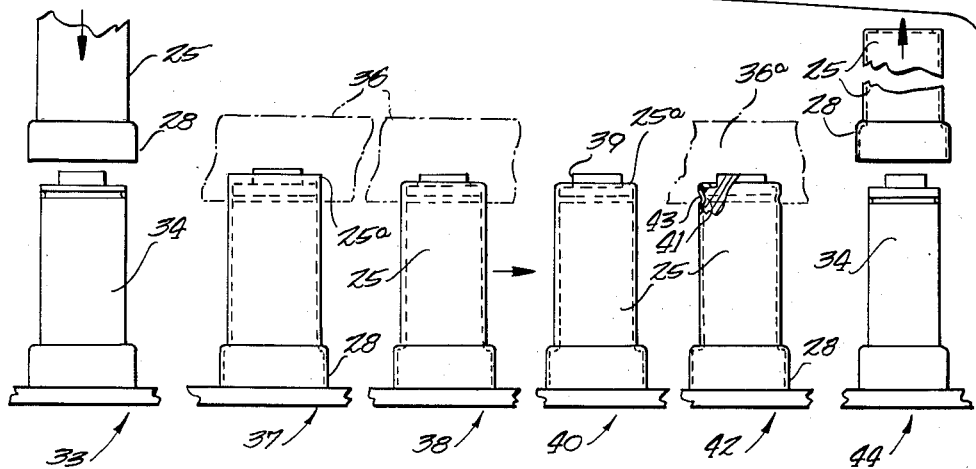
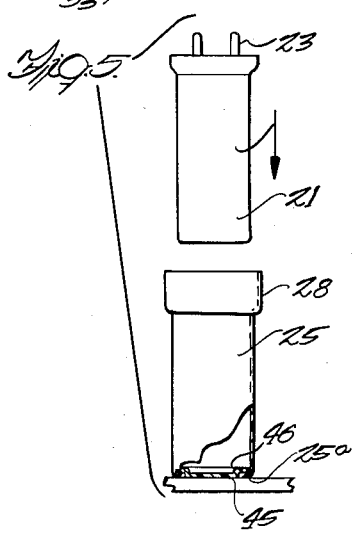
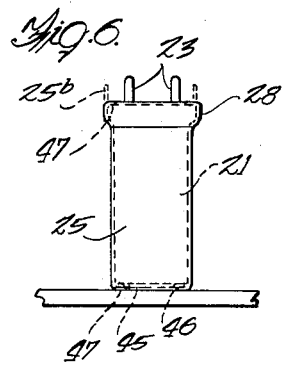
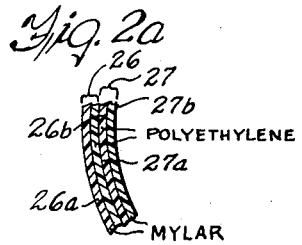

June 26, 1962 — A. FOLTA — 3,040,385
METHOD OF JACKETING A CAPACITOR AND PRODUCT
Filed Dec. 5, 1960 — 2 Sheets-Sheet 2
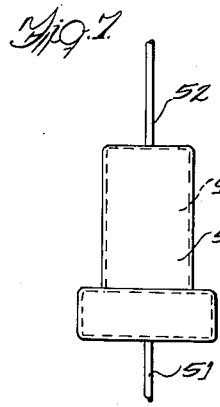
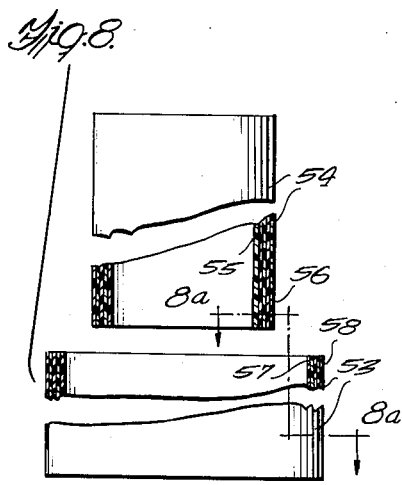
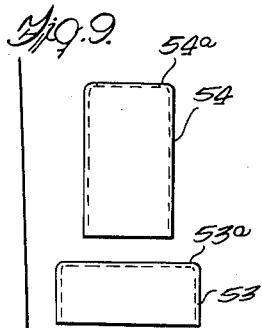
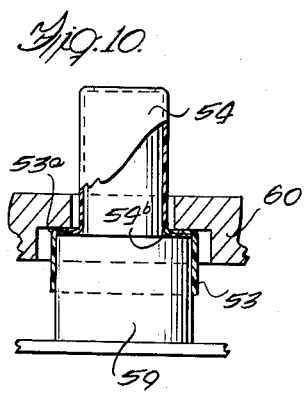
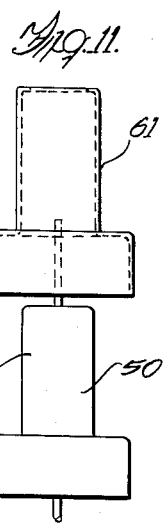
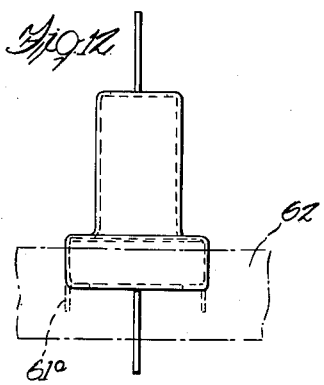
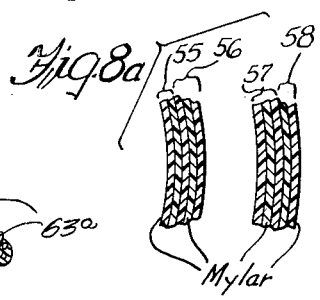
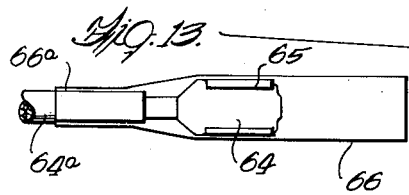
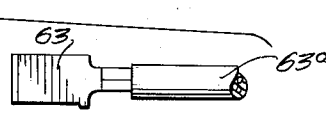
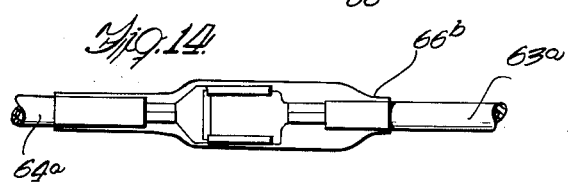
Inventor
Andrew Folta
Attorneys United States Patent Office 3,040,385
Patented June 26, 1962

3,040,385
METHOD OF JACKETING A CAPACITOR AND PRODUCT
Andrew Folta, Lakewood, Ohio, assignor to Precision Paper Tube Company, Chicago, Ill., a corporation of Illinois
Filed Dec. 5, 1960, Ser. No. 73,838
8 Claims. (Cl. 18—59)

This invention relates to a method of jacketing a capacitor and product, and, more particularly, to a capacitor of the electrolytic type.

Electrolytic condensers have been jacketed with a number of materials in the past in order to provide both a thermal and an electrical barrier between the capacitor and its surroundings. The jacketing materials and methods have only limitedly attained these objectives, notwithstanding extensive and expensive preparation and procedure. Therefore, it is an object of this invention to provide a method and product which overcomes the shortcomings of the hitherto-employed practice.

Another object is to provide a method of jacketing a condenser in which a uniquely laminated product is formed about the condenser without damaging the condenser. Still another object is to provide a method and product for jacketing a condenser in which polyethylene and ethylene terephthalate cooperate to provide a unique covering.

Other objects and advantages of the invention can be seen in the details of construction and operation set down in this specification.

The invention will be described in conjunction with an illustrative embodiment in the accompanying drawing, in which:

FIG. 1 is an elevational view of a jacketed condenser, partially broken away;

FIG. 2 is an elevational view, partially in section, of an unformed tube employed to provide the jacket portion of the condenser element seen in FIG. 1;

FIG. 2A is a fragmentary sectional view taken along the line 2A—2A of FIG. 2;

FIG. 3 is an elevational view showing the first stage of formation of the tube of FIG. 2;

FIG. 4 is a series of elevational views showing the progressive formation of the tube in becoming a jacket for a condenser;

FIG. 5 is an elevational view of the further formation of the tube after the tube has proceeded through the sequence of operations illustrated in FIG. 4;

FIG. 6 is an elevational view showing the application of the jacket to a condenser to provide the structure of FIG. 1;

FIG. 7 is an elevational view of another form of electrolytic condenser equipped with a jacket, and is essentially analogous to the showing of FIG. 1;

FIG. 8 is an elevational view of the two portions of the jacket of FIG. 7 before the same are formed and integrated;

FIG. 8A is a fragmentary sectional view taken along the line 8A—8A of FIG. 8;

FIG. 9 is a view similar to FIG. 8, showing the two portions prior to integration but after formation;

FIG. 10 is a view showing the step of integrating the two tube portions;

FIG. 11 is an elevational view showing the integrated jacket of FIG. 10 being applied to a condenser;

FIG. 12 is an elevational view of the step of shrinking the bottom portion of the tube in place around the condenser to develop the construction of FIG. 7;

FIG. 13 is a view of electrical fittings equipped with a tube embodying teachings of the invention; and FIG. 14 is a view of the fittings connected with the tube encompassing the joined fitting.

Referring now to the drawing, and in particular to FIG. 1, the numeral 20 designates generally a jacketed capacitor provided in accordance with the teachings of this invention. The jacketed capacitor 20 includes an electrolytic condenser 21 which is equipped with the usual annular flange portion 22 adjacent the base thereof. Projecting downwardly from the base of the condenser are the usual legs 23. The condenser 21 is seen to be equipped with a laminated jacket generally designated 24, and which is developed from the structures shown in the remaining views on the first sheet of the drawing.

Referring now to FIG. 2, an unformed tube 25 is seen, which ultimately becomes the jacket 24. The tube 25 is a laminate of polyethylene and ethylene terephthalate. More precisely, the tube 25 includes an outer layer 26 and an inner layer 27. Each of the layers 26 or 27 is a laminate consisting of (1) an oriented material such as the ethylene terephthalate produced by the Polychemicals Division of the E. I. du Pont de Nemours & Co., Inc., of Wilmington, Delaware, under the trademark Mylar and (2) a thermoplastic material such as polyethylene. Additional details on these materials may be found in my copending application, Serial No. 23,035, filed April 18, 1960.

Referring now to FIG. 3, the tube 25 is seen in the process of being equipped with an annular, axially-extending flange 28. For this purpose, the tube 25 is placed erect on a work surface 29, and a stretching member 30 is inserted thereto. When the base 31 of the stretching member 30 engages the work surface, stretching elements 32 are forced laterally outward to deform the tube 25 into the condition shown. Upon raising of the member 30, the elements 32 are retracted radially to complete a cylindrical contour with the remainder of member 30. Subsequent steps of formation are seen in FIG. 4.

Referring now to FIG. 4, the portion designated generally by the numeral 33 shows the tube 25 equipped with the flange 28 being mounted on a die member 34. The die member 34 essentially conforms to the interior configuration of the tube 25, but is somewhat smaller to provide a loose fit. It will be noted that the die member 34 is somewhat shorter than tube 25 so as to provide an overlap as at 25a in the second view or portion making up the sequence of FIG. 4.

After the step of mounting has been achieved, the tube-equipped die enters a heating assembly 36, the position of the tube-equipped die being generally designated by the numeral 37. Here, the upper portion of the tube is heated until the upper end starts to shrink inwardly into conforming relation with the top of the die 34, as is illustrated in the tube-equipped die designated 38 seen about to leave the heater 36. The portion 25a is seen to assume the shape of an inwardly-directed flange.

The shrinkage of the upper end 25a of the tube 25 on the die 34 may be confined and restricted by providing an annular recess as at 39 in the sequence of FIG. 4 designated generally by the numeral 40. If desired, a pressing die may be urged against the top surface of the die 34 to further establish this conformity.

The tube 25 may be further shaped by subjecting the upper end portion thereof while the tube 25 is on the die 34 to heating within a heater 36a to urge the tube 25 into an annular recess 41, this operation being seen in the portion of FIG. 4 generally designated 42.

The development of an annular recess 43 adjacent to but spaced from the upper end of the tube 25 proves advantageous in supporting a top disc which will be described in greater detail hereinafter and more particularly with reference to FIG. 5.

However, still referring to FIG. 4, the last portion thereof is designated generally by the numeral 44 and shows the formed tube 25 being removed from the die 34. In this form, the tube 25 may be transmitted to a condenser manufacturer for application to the condenser. Such a procedure is seen in FIG. 5, where the formed tube 25 is in the process of being installed on an electrical condenser 21 so as to develop the configuration of FIG. 1. A covering for the top surface is provided in the form of a disc 45, which may be suitably stepped as at 46 so as to provide a substantially flush top surface for the condenser jacket 24. For this purpose, ethylene terephthalate may be employed, although presently the heavier clear form of this plastic is limited to 0.007". If greater thicknesses are desired, along with the advantageous clarity, discs such as 45 may be formed of other plastics such as acetate butyrate. It will be apparent that the disc 45 may be introduced into the tube 25 at the beginning of the FIG. 4 sequence.

The disc 45 desirably fits loosely within the formed tube 25 so as to preclude the development of any undesirable bubble. The shouldered disc 45, i.e., a disc 45 equipped with the shoulder 46, proves advantageous in use as when a chassis equipped with the condenser 20 is upended. Frequently, the electrolytic condenser extends upwardly a greater distance than the surrounding electronic elements, so it is the top of the condenser that makes first contact with any object when the chassis carrying the condenser is upended. By employing the shouldered disc seen in FIG. 5, there is substantial protection against undesirable ripping of the jacket which might occur when the jacketed condenser 20 hits against a sharp object. As pointed out previously, the annular recess 41 may be employed to hold the disc 45 in place prior to application to a condenser 21.

After the formed tube 25 and top disc 45 have been applied to the condenser 21 as indicated in FIG. 5, the extreme lower portion of the tube 25 may be formed inwardly as at 47 in FIG. 6. Referring now to FIG. 6, the numeral 21 again designates an electrolytic condenser, and the numeral 25 designates the jacket which is equipped with top disc 45. The jacket 25 is equipped with an overlap or extension 25b which ultimately becomes the portion 47. For the purpose of achieving the inward shrinkage as at 47 so as to lock the jacket 25 on the condenser 21, a heater (not shown) of the nature designated 36a in connection with the operation shown in FIG. 4 may be employed. The closing of the bottom as at 47 urges the condenser 21 upwardly against the disc 45 to further immobilize the same.

The jacket seen in FIG. 2 desirably may be constructed with the layer 26 having ethylene terephthalate outermost as at 26a, with polyethylene provided interiorly as at 26b. The arrangement of these two plastic materials in the layer 27 is reversed. The outer lamina of the layer 27 is polyethylene as designated by the numeral 27a, while the inner layer is ethylene terephthalate as designated by the numeral 27b. The layers 26 and 27 preferably are spirally wound in overlapping relation, as can be seen from the juncture lines 48. The heat shrinkage of the tube 25 can be achieved by employing elements ranging up to 1200° F. in the heating zone 36 or 36a, as the case may be, without raising the temperature within the tube 25 to above 125° C. Most electrolytic capacitors are heat-sensitive in that the ambient temperature thereabout must be restricted to below 85–125° C. to prevent condenser deterioration.

In the illustration given, the heater 36 produces an ambient temperature about the tube 25 sufficient to cause the polyethylene portion of the tube 25 to soften. The ethylene terephthalate has a reorientation temperature considerably higher, approximately 350–450° F. When the tube 25 is subjected to heat of this order, the tube shrinks to constrict the end of the tube about the die 34 but without separation of either the laminations or the spiral windings. As such, the polyethylene flows under the imposition of a temperature above its melting-point to compensate for shrinkage of the ethylene terephthalate, all while maintaining a firm bond between the ethylene terephthalate layers.

Referring now to the second sheet of drawings, and more particularly to FIG. 7, another form of electrolytic condenser is seen therein. Here the condenser is designated by the numeral 49, while the jacket therefor is designated generally by the numeral 50. The condenser 49 is seen to be equipped with leads 51 and 52 leading, respectively, from the bottom and top of condenser 49. The jacket 50, by reference to FIG. 8, can be seen to be made up of two tubes 53 and 54 of dissimilar diameter and constitution. The upper tube 54 is constructed of two lamina 55 and 56. The innermost lamina 55 has a layer of Mylar bonded to the inside of a film of polyethylene. The layer 56 includes three superposed films, two of the films being polyethylene, with the central film being Mylar. Thus, when the layers 55 and 56 are spirally wound on each other, there is a polyethylene film in each layer in contacting relation.

The organization of the films making up the tube 53 is essentially the reverse of that seen relative to the tube 54. Here, the inner layer 57 corresponds to the layer 56 which is the outer layer in tube 54. The layer 57 has a film or lamina of Mylar sandwiched between polyethylene layers. The outer layer 58 which is spirally wound on the layer 57 has lamina of polyethylene and Mylar, with the Mylar lamina external. Again, it will be seen that the layers 57 and 58 are joined through adjacent polyethylene layers, the spiral winding being achieved in the presence of the heat which causes the polyethylene laminae to fuse to each other.

In FIG. 9, the upper end of each tube is seen to be inwardly constricted as at 54a relative to tube 54, and 53 relative to tube 53. The constricting of these tubes can be achieved in a fashion analogous to that seen in FIG. 4 and relative to tube 25. At the time of the upper end constriction, the tubes 53 and 54 are maintained separately, so it is believed that exposition of this operation in detail is unnecessary at this juncture.

Referring now to FIG. 10, it will be seen that the tube 53, equipped with its upper end constricted as at 53a, has been mounted on a die 59. Previously, the tube 54 has been outwardly flanged as at 54b through a flaring operation essentially analogous to that seen in FIG. 3 but which produces a flare rather than a shouldered flange. The flared portion 54b of the tube 54 is interposed between the constricted portion 53a of tube 53 and the die 59, and the assembly so achieved is subjected to heat by means of a heater 60. Again, the heater 60 is capable of developing an ambient temperature of a value productive of flowing or softening the polyethylene. It will be appreciated from a consideration of FIG. 8 that a polyethylene lamina is the innermost lamina of tube 53, while a polyethylene lamina is the outermost lamina of tube 54. This heating operation results in the development of a composite formed tube 61 such as is seen in FIG. 11. Alternatively, the operation of FIG. 10 may be achieved through the use of a heating die operating to urge the flared portion 54b against the constricted portion 53a.

Referring now to FIG. 11, the step of introducing the electrolytic condenser 49 into the formed tube 61 is illustrated. Subsequently, as seen in FIG. 12, the lower end of the tube 61 is subjected to a radial heater 62, which results in peening under the lower end portion 61a of the tube 61 in a fashion analogous to that seen with respect to FIG. 6.

The invention also has application to the assembly of terminal lugs for the condensers or other electrical elements, if desired, and such may be seen by reference to FIGS. 13 and 14. In these two views, spade-shaped lugs are provided, the male lug being designated 63 while the female lug is designated 64. The female lug is seen to be equipped with channel sides as at 65 adapted to receive the spade lug 63. Each lug is equipped with a lead or conduit designated respectively by the numerals 63a and 64a. The female lug 64 is equipped with a sleeve 66 constricted at one end as at 66a about the female lug conduit 64a. Advantageously, the sleeve 66 may be constructed in a fashion analogous to the tube 25 shown in detail in FIG. 2. After the male spade lug 63 has been introduced into the female spade lug 64, the sleeve 66 may be constricted adjacent the male end as at 66b by virtue of the application of heat in a fashion analogous to that described hereinbefore. Thus, a connection is achieved that is both thermally and electrically insulated.

A variety of heating conditions may be employed for achieving the constrictions and shrinkages described. Excellent results are obtained through the use of 1200° F. electrical resistance elements encased within a foot long housing wherein the tubes to be constricted have a 15 second residence time positioned about one to two inches away from the heating element and in the absence of any air currents.

While, in the foregoing specification, I have set forth a detailed description of embodiments of the invention for the purpose of explanation thereof, many variations in the details herein given may be made by those skilled in the art without departing from the spirit and scope of the invention.

I claim:
1. In a jacket for a capacitor, a hollow cylindrical member constructed of a plurality of superposed layers of plastic material, each layer comprising a laminate of polyethylene and ethylene terephthalate, each layer being helically arranged, with a polyethylene lamina in one layer being fused to the polyethylene lamina in an adjacent layer, one end of said member being constricted without delamination, the other end of said member being enlarged.

2. The structure of claim 1 in which a pair of cylindrical tubes are provided in coaxial relation to define said member, one of said tubes having a diameter corresponding to said enlarged portion.

3. The structure claim 2 in which said larger tube is constructed of two helically-wound layers, the outermost layer having laminae of polyethylene confining a lamina of ethylene terephthalate, the other tube comprising a pair of layers with the inner layer comprising polyethylene laminae confining a lamina of ethylene terephthalate.

4. A condenser jacketing method, comprising:
(A) providing a cylinder constructed of helically wound layers arranged in overlapping relation with each layer being a laminate of oriented ethylene terephthalate and polyethylene and with a polyethylene face of one layer being in confronting, united relation with a polyethylene face of the other layer,
(B) mounting said cylinder on a tubular die with one cylinder end projecting beyond the die,
(C) heating the projected end portion to a temperature above the reorientation temperature for said ethylene terephthalate to shrink said end portion into a radially inwardly-extending lip,
(D) removing said cylinder from said die and prior to applying said cylinder to a condenser,
(E) providing the other end of said cylinder with a radially enlarged portion,
(F) inserting a capacitor into the enlarged end of said cylinder, said capacitor being sized to provide a portion of said cylinder projecting beyond said capacitor at said cylinder other end, and
(G) heating the projected other end to a temperature above the reorientation temperature of said ethylene terephthalate to shrink said other end into a radially inwardly-extending lip to lock the cylinder on the condenser.

5. A condenser jacketing method, comprising:
(A) providing a cylinder constructed of helically wound layers arranged in overlapping relation with each layer being a laminate of oriented ethylene terephthalate and polyethylene and with a polyethylene face of one layer being in confronting, united relation with a polyethylene face of the other layer,
(B) mounting said cylinder on a tubular die with one cylinder end projecting beyond the die,
(C) heating the projected end portion to a temperature above the reorientation temperature for said ethylene terephthalate to shrink said end portion into a radially inwardly-extending lip,
(D) removing said cylinder from said die and prior to applying said cylinder to a condenser
(i) introducing a plastic disk into said cylinder and positioning said disk perpendicular to the cylinderical axis at said one end,
(E) providing the other end of said cylinder with a radially enlarged portion,
(F) inserting a capacitor into the enlarged end of said cylinder, said capacitor being sized to provide a portion of said cylinder projecting beyond said capacitor at said cylinder other end, and
(G) heating the projected other end to a temperature above the reorientation temperature of said ethylene terephthalate to shrink said other end into a radially inwardly-extending lip to lock the cylinder on the condenser.

6. A condenser jacketing method, comprising:
(A) providing a cylinder constructed of helically wound layers arranged in overlapping relation with each layer being a laminate of oriented ethylene terephthalate and polyethylene and with a polyethylene face of one layer being in confronting, united relation with a polyethylene face of the other layer,
(B) mounting said cylinder on a tubular die with one cylinder end projecting beyond the die,
(C) heating the projected end portion to a temperature above the reorientation temperature for said ethylene terephthalate to shrink said end portion into a radially inwardly-extending lip,
(D) removing said cylinder from said die and prior to applying said cylinder to a condenser
(i) introducing a plastic disk into said cylinder and positioning said disk perpendicular to the cylindrical axis at said one end,
(ii) said disk having a circular, central raised portion fitting within the opening defined by said lip,
(E) providing the other end of said cylinder with a radially enlarged portion,
(F) inserting a capacitor into the enlarged end of said cylinder, said capacitor being sized to provide a portion of said cylinder projecting beyond said capacitor at said cylinder other end, and
(G) heating the projected other end to a temperature above the reorientation temperature of said ethylene terephthalate to shrink said other end into a radially inwardly-extending lip to lock the cylinder on the condenser.

7. A condenser jacketing method, comprising:
(A) providing a cylinder constructed of helically wound layers arranged in overlapping relation with each layer being a laminate of oriented ethylene terephthalate and polyethylene and with a polyethylene face of one layer being in confronting, united relation with a polyethylene face of the other layer,
(B) mounting said cylinder on a tubular die with one cylinder end projecting beyond the die,
(C) heating the projected end portion to a temperature above the reorientation temperature for said ethylene terephthalate to shrink said end portion into a radially inwardly-extending lip,
(D) removing said cylinder from said die and prior to applying said cylinder to a condenser, (E) providing the other end of said cylinder with a radially enlarged portion,
   (i) said enlarged portion comprising a tubular portion arranged coaxially relative to said cylinder and united thereto by a shoulder defined by a flared portion on said cylinder and a radially inwardly-extending lip on said tubular portion, (F) inserting a capacitor into the enlarged end of said cylinder, said capacitor being sized to provide a portion of said cylinder projecting beyond said capacitor at said cylinder other end, and (G) heating the projected other end to a temperature above the reorientation temperature of said ethylene terephthalate to shrink said other end into a radially inwardly-extending lip to lock the cylinder on the condenser.

8. A condenser jacketing method, comprising:

(A) providing a cylinder constructed of helically wound layers arranged in overlapping relation with each layer being a laminate of oriented ethylene terephthalate and polyethylene and with a polyethylene face of one layer being in confronting, united relation with a polyethylene face of the other layer, (B) mounting said cylinder on a tubular die with one cylinder end projecting beyond the die.

(C) heating the projected end portion to a temperature above the reorientation temperature for said ethylene terephthalate to shrink said end portion into a radially inwardly-extending lip, (D) removing said cylinder from said die and prior to applying said cylinder to a condenser, (E) providing the other end of said cylinder with a radially enlarged portion,
   (i) said enlarged portion comprising a tubular portion arranged coaxially relative to said cylinder and united thereto by a shoulder defined by a flared portion on said cylinder and a radially inwardly-extending lip on said tubular portion,
   (ii) said tubular portion having an interior wall defined by a polyethylene face and said cylinder having an exterior wall defined by a polyethylene face, (F) inserting a capacitor into the enlarged end of said cylinder, said capacitor being sized to provide a portion of said cylinder projecting beyond said capacitor at said cylinder other end, and (G) heating the projected other end to a temperature above the reorientation temperature of said ethylene terephthalate to shrink said other end into a radially inwardly-extending lip to lock the cylinder on the condenser.

References Cited in the file of this patent

UNITED STATES PATENTS

| | | |
|---|---|---|
| 2,919,059 | Sporka | Dec. 29, 1959 |
| 2,943,359 | Sussman | July 5, 1960 |
| 2,989,785 | Stahl | June 27, 1961 |